United States Patent
Guidry et al.

(10) Patent No.: US 9,631,469 B2
(45) Date of Patent: *Apr. 25, 2017

(54) ADJUSTABLE FRACTURING SYSTEM

(71) Applicant: Cameron International Corporation, Houston, TX (US)

(72) Inventors: Kirk P. Guidry, Cypress, TX (US); James D. Cavanagh, Cedar Park, TX (US); Brandon B. Shirley, Singapore (SG)

(73) Assignee: Camerson International Corporation, Houston, TX (US)

(*) Notice: Subject to any disclaimer, the term of this patent is extended or adjusted under 35 U.S.C. 154(b) by 438 days.

This patent is subject to a terminal disclaimer.

(21) Appl. No.: 14/346,204

(22) PCT Filed: Sep. 21, 2012

(86) PCT No.: PCT/US2012/056520
§ 371 (c)(1),
(2) Date: Mar. 20, 2014

(87) PCT Pub. No.: WO2013/043995
PCT Pub. Date: Mar. 28, 2013

(65) Prior Publication Data
US 2014/0246211 A1    Sep. 4, 2014

Related U.S. Application Data

(63) Continuation-in-part of application No. 13/243,252, filed on Sep. 23, 2011.

(51) Int. Cl.
*E21B 43/26* (2006.01)
*F16L 27/12* (2006.01)

(52) U.S. Cl.
CPC .............. *E21B 43/26* (2013.01); *F16L 27/12* (2013.01); *Y10T 137/85938* (2015.04)

(58) Field of Classification Search
CPC ........ E21B 43/26; E21B 17/02; E21B 33/068; E21B 21/106; F16L 27/12; Y10T 137/85938

See application file for complete search history.

(56) References Cited

U.S. PATENT DOCUMENTS 1,615,536 A * 1/1927 Del Mar ............. F16L 27/1008
285/32
3,233,668 A    2/1966 Hamilton et al.
(Continued)

FOREIGN PATENT DOCUMENTS

CA        2178856       12/1997

OTHER PUBLICATIONS

Copenheaver, PCT International Search Report and Written Opinion for PCT/US12/72214, mailed Mar. 4, 2013.
(Continued)

*Primary Examiner* — Robert E Fuller
*Assistant Examiner* — David Carroll
(74) *Attorney, Agent, or Firm* — Eubanks PLLC

(57) ABSTRACT

An adjustable fracturing system (10) is provided. The system includes an adjustment joint (60, 62, 64, 130, 170, 224) configured to be varied in length to facilitate coupling of a fracturing manifold (22) to a fracturing tree (20). In one embodiment, the system may also include the fracturing manifold and the fracturing tree. Additional systems, devices, and methods are also disclosed.

10 Claims, 13 Drawing Sheets

(56) References Cited

U.S. PATENT DOCUMENTS

| | | | |
|---|---|---|---|
| 4,355,961 A * | 10/1982 | Riggs | F02M 47/046 137/624.15 |
| 4,366,864 A | 1/1983 | Gibson et al. | |
| 4,570,673 A * | 2/1986 | Kendrick | E21B 21/02 137/267 |
| 4,603,887 A | 8/1986 | Mayfield et al. | |
| 4,767,136 A | 8/1988 | Lehmann | |
| 6,234,030 B1 | 5/2001 | Butler | |
| 6,364,024 B1 | 4/2002 | Dallas | |
| 8,905,056 B2 | 12/2014 | Kendrick | |
| 8,978,763 B2 * | 3/2015 | Guidry | E21B 43/26 166/177.5 |
| 9,127,545 B2 | 9/2015 | Kajaria et al. | |
| 2003/0205378 A1 | 11/2003 | Wellington et al. | |
| 2003/0205385 A1 | 11/2003 | Duhn et al. | |
| 2004/0251020 A1 | 12/2004 | Smith | |
| 2008/0277120 A1 | 11/2008 | Hickie | |
| 2009/0261575 A1 | 10/2009 | Bull et al. | |
| 2010/0051261 A1 | 3/2010 | Koleilat et al. | |
| 2010/0300672 A1 | 12/2010 | Childress et al. | |
| 2011/0108275 A1 | 5/2011 | Borak et al. | |
| 2011/0114320 A1 | 5/2011 | Sponchia et al. | |
| 2011/0132596 A1 | 6/2011 | Yeh et al. | |
| 2011/0259584 A1 | 10/2011 | Broussard, II | |
| 2012/0181015 A1 * | 7/2012 | Kajaria | E21B 43/26 166/177.5 |
| 2013/0075080 A1 | 3/2013 | Guidry | |
| 2013/0076026 A1 | 3/2013 | Guidry | |
| 2013/0175038 A1 | 7/2013 | Conrad | |
| 2013/0175039 A1 | 7/2013 | Guidry | |

OTHER PUBLICATIONS

Ro, Office action in U.S. Appl. No. 13/348,428, mailed Apr. 16, 2014.
Copenheaver, PCT International Search Report and Written Opinion for PCT/US14/13219, mailed May 14, 2014.
Runyan, Office action in U.S. Appl. No. 13/243,252, mailed Jun. 20, 2014.
Young, PCT International Search Report and Written Opinion for PCT/US12/56520, Dec. 14, 2012.
Young, PCT International Search Report and Written Opinion for PCT/US12/56495, Dec. 17, 2012.
Zhao, Written Opinion from Intellectual Property Office of Singapore for Application No. 11201400846P (SG national stage entry of PCT/US12/56520), dated Sep. 5, 2014.
Zhao, Written Opinion from Intellectual Property Office of Singapore for Application No. 11201400807W (SG national stage entry of PCT/US12/56495), dated Sep. 5, 2014.

* cited by examiner

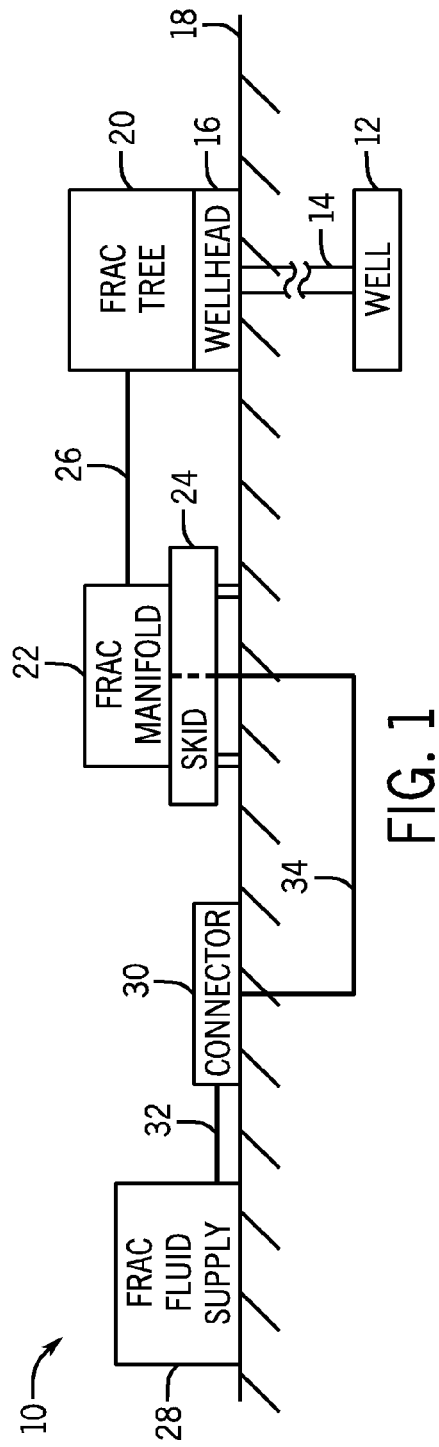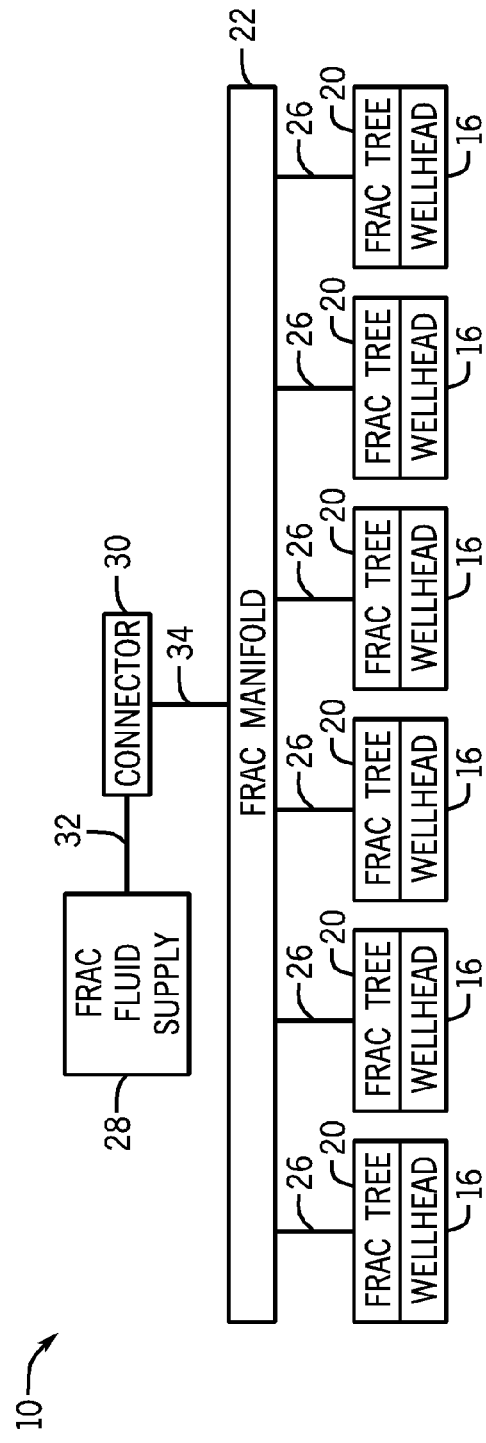

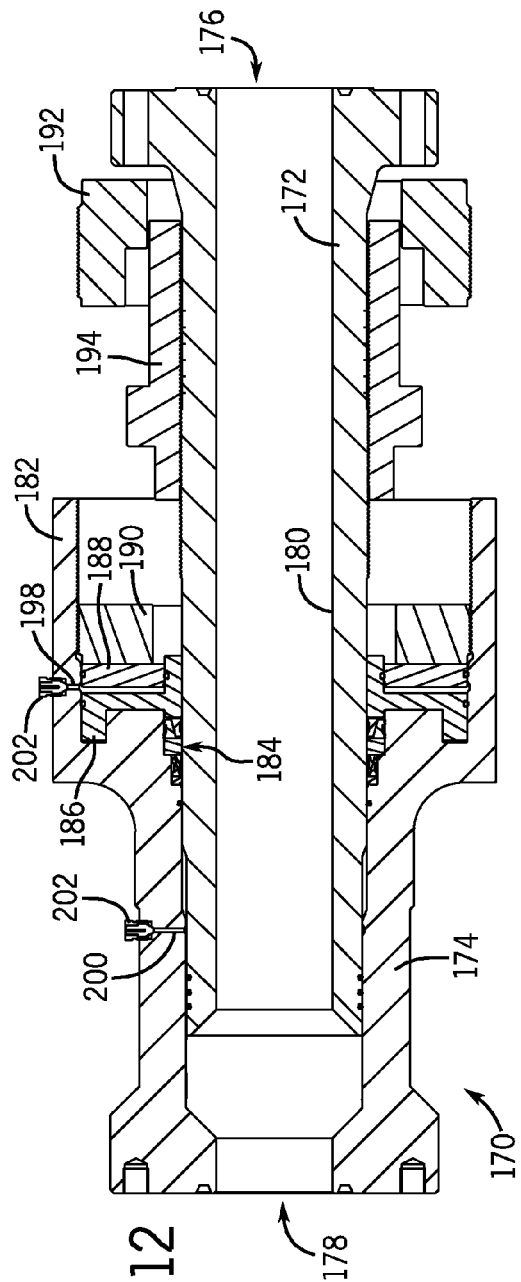
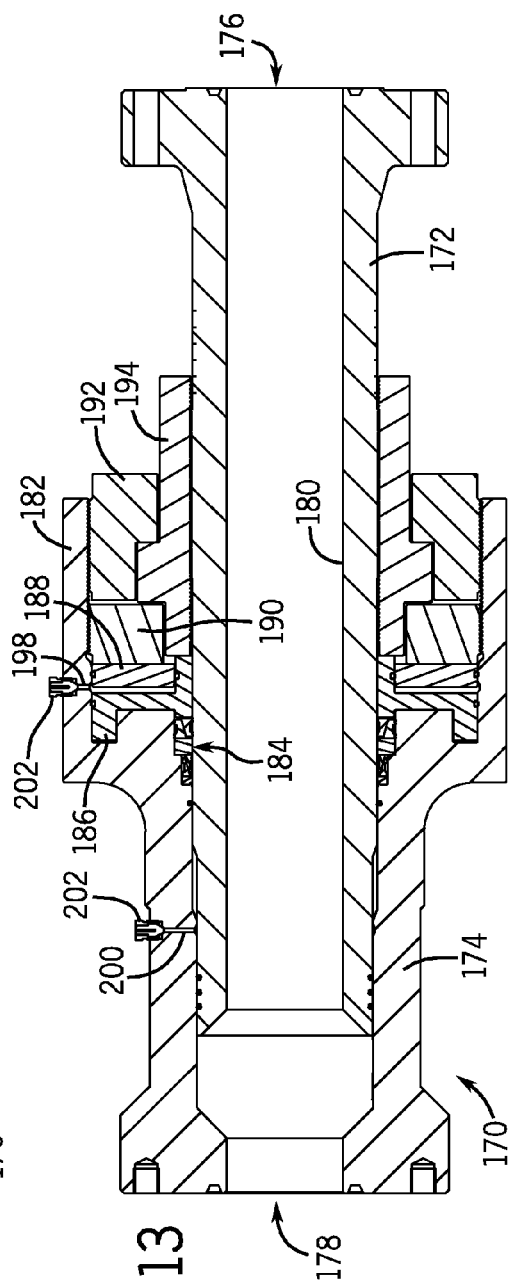
FIG. 12
FIG. 13

ADJUSTABLE FRACTURING SYSTEM

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

In order to meet consumer and industrial demand for natural resources, companies often invest significant amounts of time and money in searching for and extracting oil, natural gas, and other subterranean resources from the earth. Particularly, once a desired subterranean resource is discovered, drilling and production systems are often employed to access and extract the resource. These systems may be located onshore or offshore depending on the location of a desired resource. Further, such systems generally include a wellhead assembly through which the resource is extracted. These wellhead assemblies may include a wide variety of components, such as various casings, valves, fluid conduits, and the like, that control drilling or extraction operations.

Additionally, such wellhead assemblies may use a fracturing tree and other components to facilitate a fracturing process and enhance production from a well. As will be appreciated, resources such as oil and natural gas are generally extracted from fissures or other cavities formed in various subterranean rock formations or strata. To facilitate extraction of such resources, a well may be subjected to a fracturing process that creates one or more man-made fractures in a rock formation. This facilitates, for example, coupling of pre-existing fissures and cavities, allowing oil, gas, or the like to flow into the wellbore. Such fracturing processes typically include injecting a fracturing fluid—which is often a mixture including sand and water—into the well to increase the well's pressure and form the man-made fractures. A fracturing manifold may provide fracturing fluid to one or more fracturing trees via fracturing lines (e.g., pipes). But the fracturing manifolds and associated fracturing tress are typically large and heavy, and may be mounted to other equipment at a fixed location, making adjustments between the fracturing manifold and a fracturing tree difficult.

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Embodiments of the present disclosure generally relate to adjustable fracturing systems that facilitate alignment and coupling of a fracturing manifold with a fracturing tree via a fluid connection. In one embodiment, a fracturing system includes one or more adjustment joints that each provide at least one degree of freedom in aligning a fluid connection with a fracturing manifold and a fracturing tree. The adjustment joints may be provided in the form of fracturing heads or in some other form, such as pipe connectors. More specifically, an adjustment joint in the fracturing system may include a dimension that may be varied by a user to facilitate connection of the fracturing manifold and the fracturing tree in an efficient manner (e.g., by allowing the user to compensate for unexpected alignment issues during connection).

Various refinements of the features noted above may exist in relation to various aspects of the present embodiments. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of the some embodiments without limitation to the claimed subject matter.

BRIEF DESCRIPTION OF THE DRAWINGS

These and other features, aspects, and advantages of certain embodiments will become better understood when the following detailed description is read with reference to the accompanying drawings in which like characters represent like parts throughout the drawings, wherein:

FIG. 1 generally depicts an adjustable fracturing system in accordance with an embodiment of the present disclosure;

FIG. 2 is a diagram of the adjustable fracturing system of FIG. 1 with a fracturing manifold coupled to multiple fracturing trees in accordance with an embodiment of the present disclosure;

FIGS. 12 and 13 depict the adjustment joint of FIG. 10 at two stages of a process for increasing the length of the adjustment joint in accordance with one embodiment;

DETAILED DESCRIPTION OF SPECIFIC EMBODIMENTS

Figure 3:
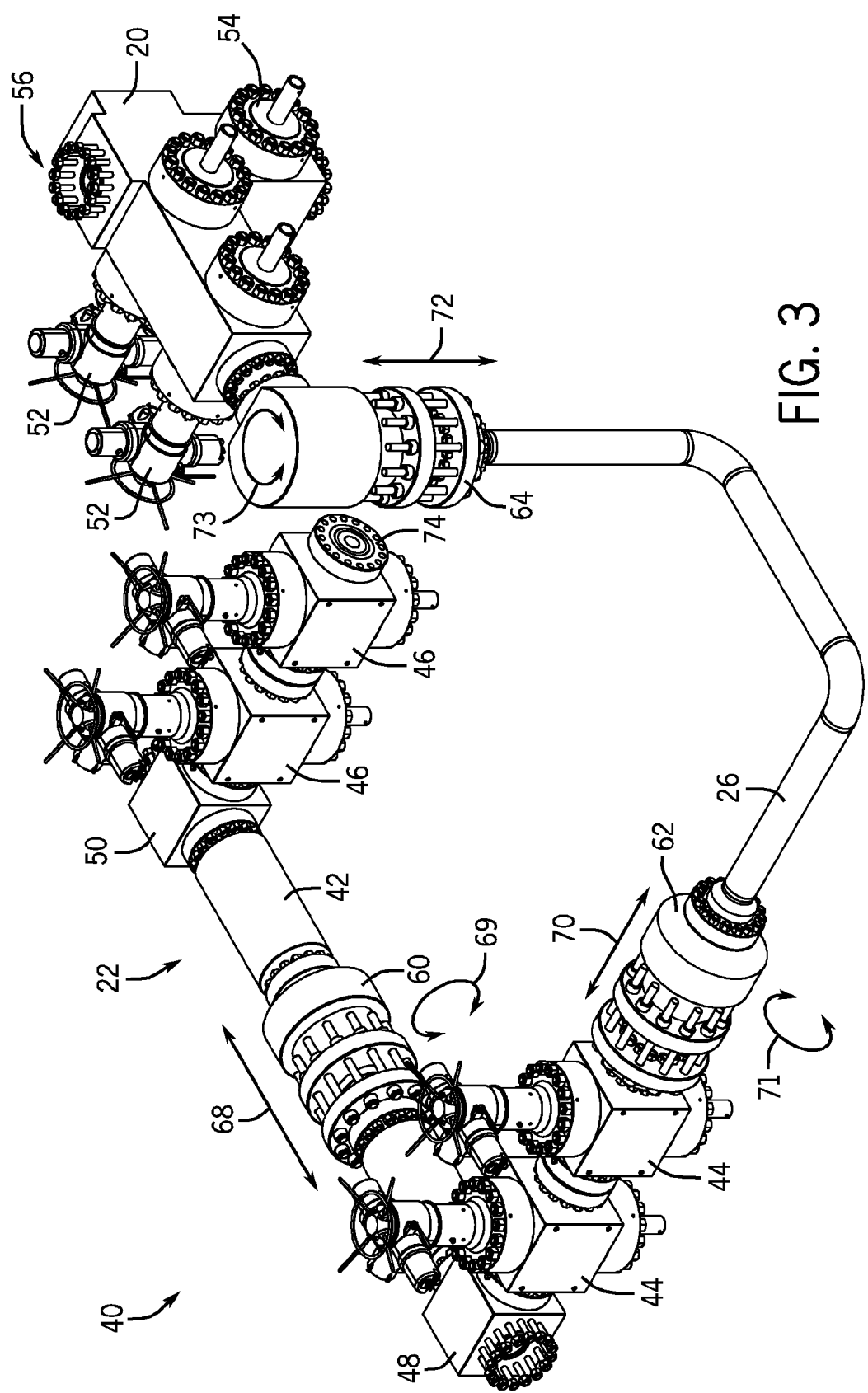
FIG. 3 is a perspective view of certain components of the adjustable fracturing system, including the fracturing manifold, one fracturing tree, and several adjustment joints in accordance with an embodiment of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements. Moreover, any use of "top," "bottom," "above," "below," other directional terms, and variations of these terms is made for convenience, but does not require any particular orientation of the components.

Turning now to the present figures, an example of a fracturing system 10 is provided in FIGS. 1 and 2 in accordance with one embodiment. The fracturing system 10 facilitates extraction of natural resources (e.g., oil or natural gas) from a well 12 via a wellbore 14 and a wellhead 16. Particularly, by injecting a fracturing fluid into the well 12, the fracturing system 10 increases the number or size of fractures in a rock formation or strata to enhance recovery of natural resources present in the formation. In the presently illustrated embodiment, the well 12 is a surface well accessed by equipment of wellhead 16 installed at surface level (i.e., on ground 18). But it will be appreciated that natural resources may be extracted from other wells, such as platform or subsea wells.

The fracturing system 10 includes various components to control flow of a fracturing fluid into the well 12. For instance, the depicted fracturing system 10 includes a fracturing tree 20 and a fracturing manifold 22. The fracturing tree 20 includes at least one valve that controls flow of the fracturing fluid into the wellhead 16 and, subsequently, into the well 12. Similarly, the fracturing manifold 22 includes at least one valve that controls flow of the fracturing fluid to the fracturing tree 20 by a conduit or fluid connection 26 (e.g., pipes).

The fracturing manifold 22 is mounted on at least one skid 24 (e.g., a platform mounted on rails) to enable movement of the fracturing manifold 22 with respect to the ground 18. As depicted in FIG. 2, the fracturing manifold 22 is connected to provide fracturing fluid to multiple fracturing trees 20 and wellheads 16. But it is noted that the fracturing manifold 22 may instead be coupled to a single fracturing tree 20 in full accordance with the present techniques. In one embodiment in which the fracturing manifold 22 is coupled to multiple fracturing trees 20, various valves of the fracturing manifold 22 may be mounted on separate skids 24 to enable variation in the spacing between the valves. And in at least some instances, as described in further detail below, such a configuration allows for easier alignment of the fluid connection 26 between the fracturing manifold 22 and the fracturing tree 20.

Fracturing fluid from a supply 28 is provided to the fracturing manifold 22. In FIG. 1, a connector 30 receives fracturing fluid from the supply 28 through a conduit or fluid connection 32 (e.g., pipes or hoses) and then transmits the fluid to the fracturing manifold 22 by way of a subterranean conduit or fluid connection 34 (e.g., pipes). In one embodiment, the fracturing fluid supply 28 is provided by one or more trucks that deliver the fracturing fluid, connect to the connector 30, and pump the fluid into the fracturing manifold 22 via the connector 30 and connections 32 and 34. In another embodiment, the fracturing fluid supply 28 is in the form of a reservoir from which fluid may be pumped into the fracturing manifold 22. But any other suitable sources of fracturing fluid and manners for transmitting such fluid to the fracturing manifold may instead be used.

A portion 40 of the fracturing system 10 is illustrated in FIG. 3 in accordance with one embodiment. In the depicted embodiment, the portion 40 includes the fracturing tree 20 and the fracturing manifold 22, as well as several adjustment joints that enable alignment of the connection line (i.e., fluid connection 26) between the fracturing tree 20 and the fracturing manifold 22. The manifold 22 includes a conduit 42 that routes fracturing fluid to valves 44 and 46. These valves 44 and 46 are coupled to connecting blocks 48 and 50 of the conduit 42 to receive fracturing fluid from the fluid supply 28 via connections 32 and 24. The fracturing fluid may then be routed through fluid connection 26 to a respective fracturing tree 20. Although the present embodiment includes two valves 44 and two valves 46, any other suitable number of valves may instead be used to control flow of fracturing fluid to fracturing trees 20. Further, while the depicted fluid connection 26 includes a single flow path or conduit (which may be a fracturing line with a seven-inch bore in one instance) between the fracturing tree 20 and the fracturing manifold 22, a fracturing system may include a greater number of conduits between the fracturing manifold and a fracturing tree in other embodiments.

The fracturing tree 20 is provided in the form of a horizontal fracturing tree in FIG. 3, though other embodiments may include a different style of fracturing tree (e.g., a vertical tree). The depicted fracturing tree 20 includes valves 52 to control flow of fracturing fluid through a horizontal portion of the tree 20. The tree 20 also includes a master valve 54 to control flow of fluids (e.g., fracturing fluids or production fluids) to or from the attached wellhead 16 (FIG. 1), and a port 56 allowing access to the wellhead 16 through the master valve 54. In other embodiments, the valve 54 may be omitted (e.g., in a composite tree arrangement with all valves integral to one block).

The portion 40 of the fracturing system 10 also includes extendable adjustment joints that facilitate connection of the fracturing manifold 22 to the fracturing tree 20. In the presently illustrated embodiment, the adjustment joints are provided in the form of adjustable fracturing heads 60, 62, and 64 (also commonly referred to as "goat heads"), though other forms of adjustment joints are also envisaged and may be used in accordance with the present techniques. In operation, the fracturing tree 20 may be mounted at a fixed location (i.e., coupled to the wellhead 16). The fluid connection 26 is aligned and coupled between the fracturing tree 20 and the fracturing manifold 22. The adjustment joints (e.g., the fracturing heads 60, 62, and 64 in FIG. 3) facilitate such alignment and coupling of the fluid connection by allowing an operator to manipulate the position of the fluid connection 26 by changing a dimension (e.g., length or height) of the adjustment joint. By providing three adjustment joints, each with a different axis of movement (i.e., up-and-down, forward-and-backward, and left-and-right), adjustments can be made to help facilitate coupling of the fracturing manifold 22 to the fracturing tree 20.

For example, the conduit 42 includes a fracturing head 60 that may be extended or retracted (as represented by arrow 68) to vary the length of the conduit 42 and the distance between the valves 44 and 46 (which may be mounted on separate skids 24, as discussed above, to allow relative motion between the valves 44 and 46). Such variation also provides a first degree of freedom in aligning the fluid connection 26 between the fracturing tree 20 and the fracturing manifold 22. In other words, the adjustment joint in conduit 42 allows the distance between the seal points of the fluid connection 26 at the fracturing tree 20 and at the fracturing manifold 22 to be varied in a first dimension.

Likewise, the fluid connection 26 in FIG. 3 includes the fracturing head 62 to vary the length of the fluid connection 26 in a second dimension, as represented by arrow 70. The adjustability of the fracturing head 62 provides a second degree of freedom in aligning the connection between the fracturing tree 20 and the fracturing manifold 22. Further, the portion 40 includes the fracturing head 64 having a variable length in a third dimension (as represented by arrow 72), thus providing a third degree of freedom in aligning the fluid connection 26 between the fracturing tree 20 and the fracturing manifold 22. These three degrees of freedom are provided by three adjustment joints having different directions of adjustment that are not parallel, and in some embodiments (such as in FIG. 3) the directions of adjustment are orthogonal to one another. In addition to these three translational degrees of freedom, one or more of the adjustment joints (e.g., fracturing heads 60, 62, and 64) may also be rotated about their axes, as indicated by arrows 69, 71, and 73, to provide rotational degrees of freedom. For example, the presently depicted embodiment provides six degrees of freedom (three translational and three rotational).

While large fracturing lines (e.g., with a seven-inch bore) are traditionally difficult to adjust between a fracturing manifold and a fracturing tree, the adjustability provided in the presently disclosed system 10 enables large fracturing lines to be aligned and connected to such components more efficiently. Consequently, as depicted in FIG. 3, a single fluid connection 26 may be provided in the form of a large-bore fracturing line, rather than using multiple smaller-bore fracturing lines between the fracturing manifold and a given fracturing tree.

While the presently depicted embodiment includes three adjustment joints, it is noted that other embodiments may include fewer adjustment joints providing fewer degrees of freedom in aligning the fluid connection 26. For instance, a single adjustment joint may be provided to give one translational degree of freedom (e.g., up-and-down, forward-and-backward, or left-and-right) in aligning the fracturing tree 20 and the fracturing manifold 22 for the fluid connection 26. Or two adjustment joints may be provided to give two translational degrees of freedom. Such adjustment joints may also provide rotational degrees of freedom as noted above. Further still, multiple adjustment joints may be aligned coaxially to provide adjustability at different locations within the system 10 (e.g., the manifold 22 may include multiple, coaxial adjustment joints).

For clarity, only a single fluid connection 26 and a single fracturing tree 20 (both of which receive fracturing fluid from the valves 44) are depicted in FIG. 3 as part of portion 40 of the fracturing system 10. But it will be appreciated that the fracturing system 10 may include additional fluid connections 26 and fracturing trees 20 (see, e.g., FIG. 2). For example, valves 46 may be coupled (e.g., via outlet 74) to another fluid connection 26 leading to a different fracturing tree 20 on another wellhead 16. Further, the conduit 42 may extend beyond the depicted connection blocks 48 and 50 to route fracturing fluid to additional valves and associated fracturing trees 20. And the conduit 42 may include additional adjustment joints to enable movement of such additional valves relative to another portion of the manifold 22, thereby facilitating alignment of these valves with their associated fracturing trees 20.

Figure 4:
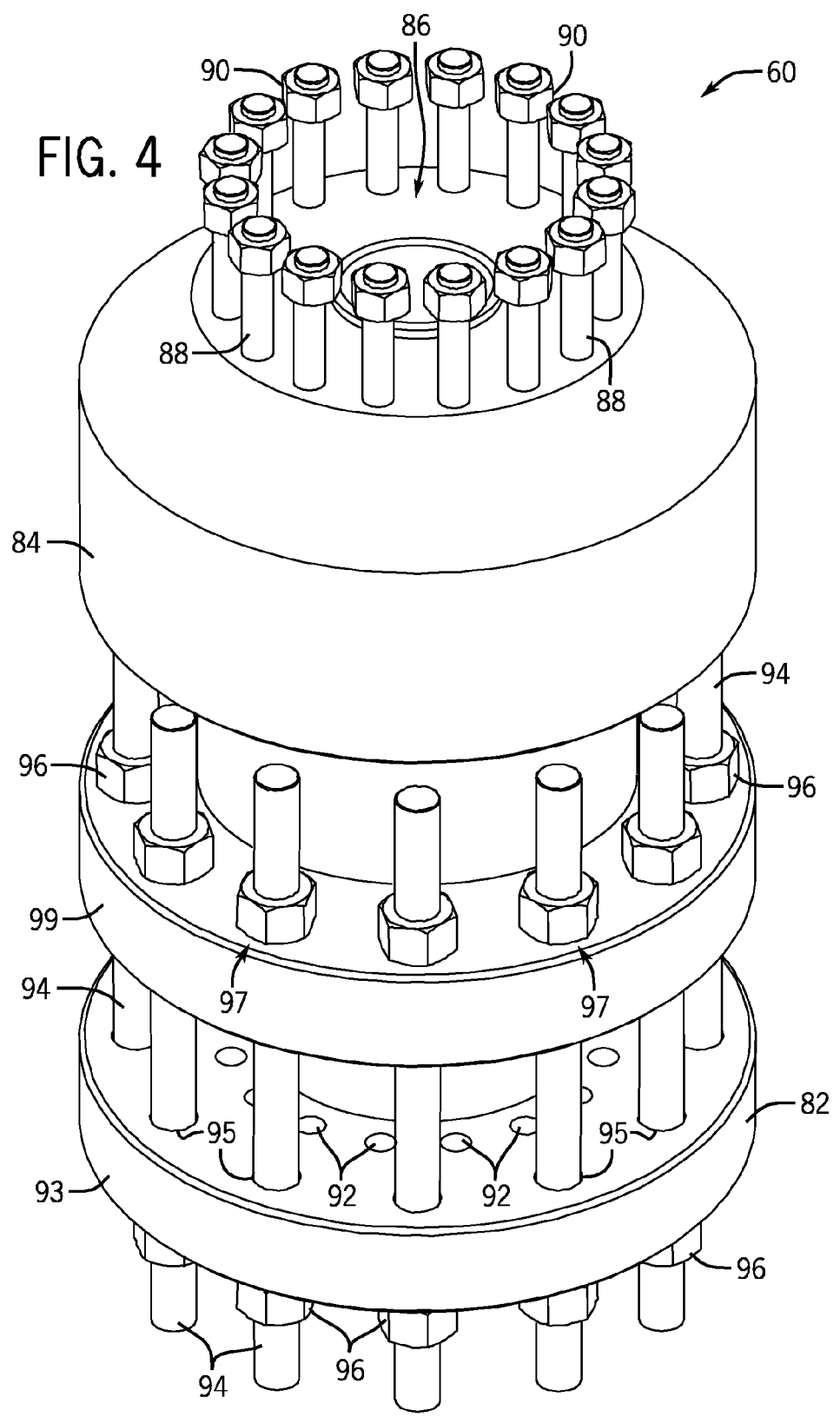
FIG. 4 is a perspective view of an adjustment joint in the form of a fracturing head in accordance with an embodiment of the present disclosure.
Figure 5:
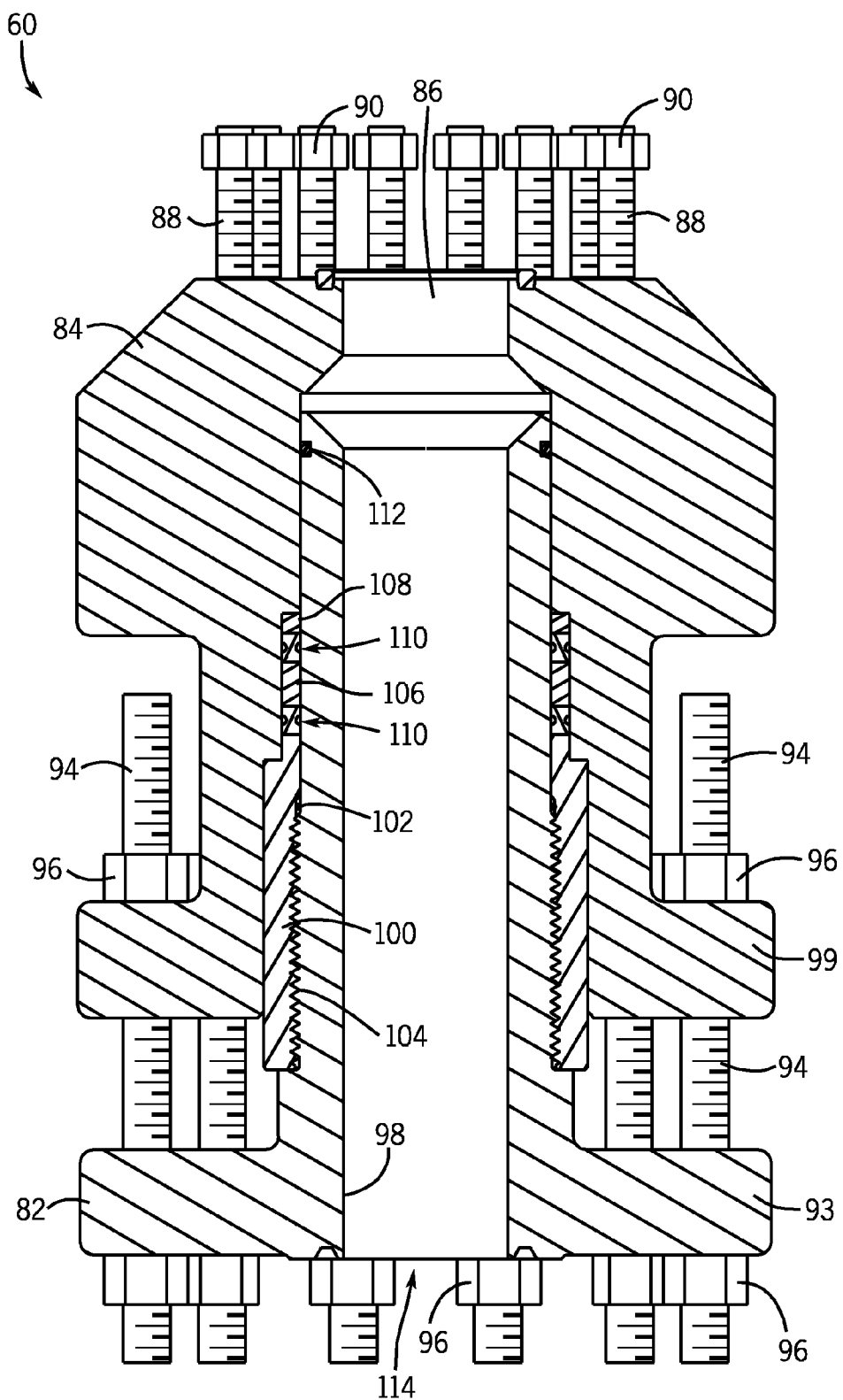
FIG. 5 is a cross-section of the fracturing head of FIG. 4 in accordance with an embodiment of the present disclosure.
Figure 6:
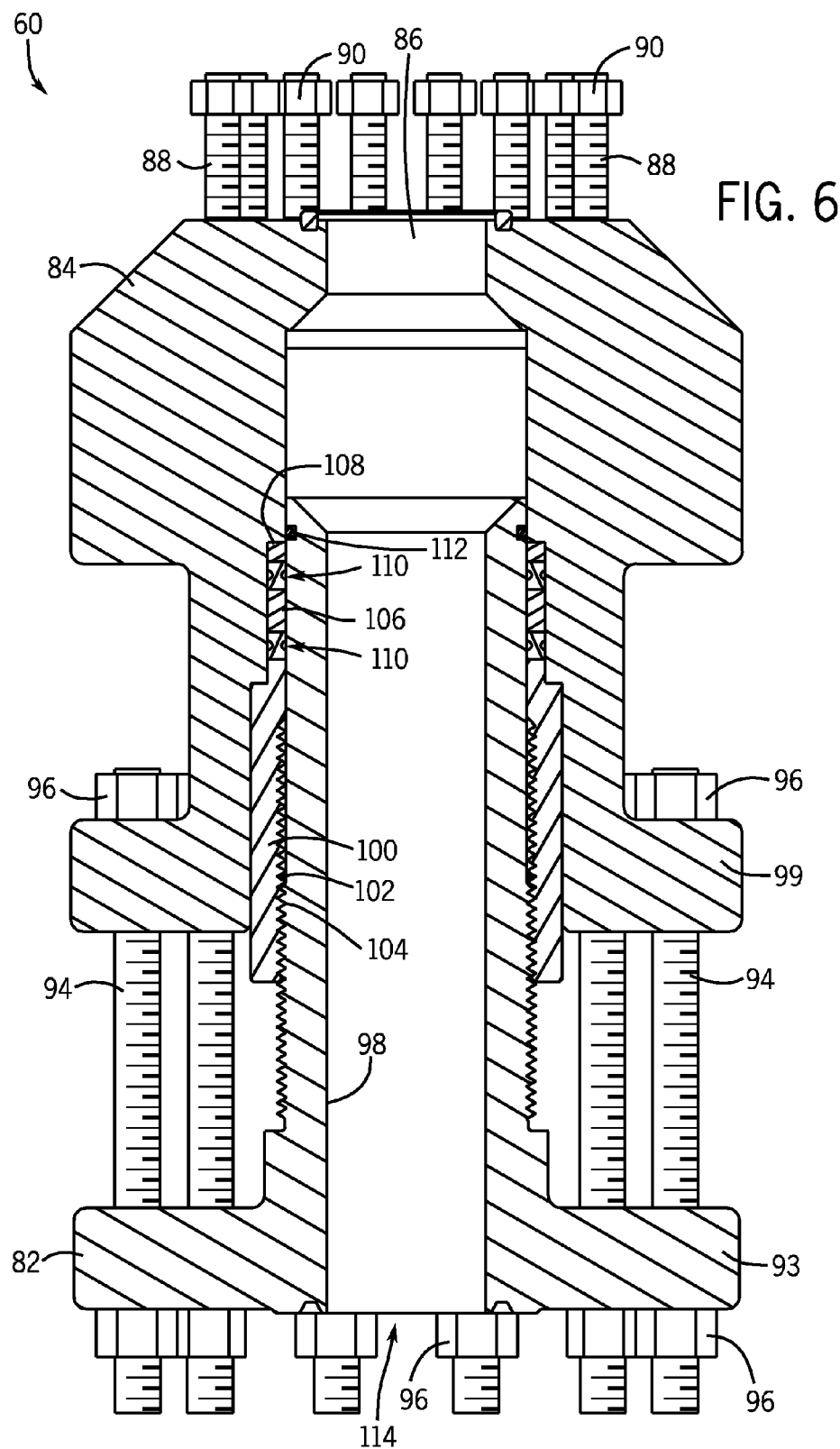
FIG. 6 generally depicts the fracturing head of FIGS. 4 and 5 following adjustment of the fracturing head to increase its length in accordance with an embodiment of the present disclosure.

The fracturing head 60, in accordance with one embodiment, is illustrated in greater detail in FIGS. 4-6. In the depicted embodiment, the fracturing head 60 includes a body having a first portion 82 and a second portion 84. The body portions 82 and 84 are configured to move with respect to one another to vary a dimension of the fracturing head and facilitate connection of the fracturing manifold 22 and the fracturing tree 20 as described above. The fracturing head 60 includes fluid ports 86 and 114 (FIG. 5) to transmit fluid through the fracturing head 60. In some embodiments, such as when installed in the fracturing system 10 in the manner depicted in FIG. 3, the fluid port 86 may be considered an output port and the fluid port 114 may be considered an inlet port. In addition to the fluid port 86, the second body portion 84 includes a set of studs 88 and nuts 90 for connecting the fracturing head 60 to another component (e.g., via an API flange or other connector). Similarly, the first body portion 82 includes through holes 92 arranged in a flange 93 about the fluid port 114 for coupling to another component (e.g., also coupled to an API flange via additional studs and nuts or to another connector). The first body portion 82 includes an additional set of through holes 95 positioned radially outward from the through holes 92. The through holes 95 are aligned with mating holes 97 in a flange 99 of the second body portion 84, and the first and second body portions 82 and 84 are secured to one another with studs 94 (through the holes 95 and 97) and nuts 96.

As depicted in FIGS. 5 and 6, a bore 98 extends through the fracturing head 60 between the fluid ports 86 and 114. The bore 98 may have a diameter similar or identical to that of the components coupled to the fluid ports 86 and 114, such as seven inches in one embodiment (though other diameters may be used for the bore 98, as well as for other components). The bore may also be sized to match the inner diameter of the production casing in the well (i.e., a full bore arrangement) to facilitate the passage of tools, plugs, or the like through the fracturing head 60. The fracturing head 60 includes an adjustment collar 100 that may be rotated on threads 104 by a user to translate the collar 100 with respect to the body portion 82 or 84 of the fracturing head 60 on which the collar is threaded (i.e., first body portion 82 in FIGS. 5 and 6). Movement of the adjustment collar 100 allows adjustment of the length of the fracturing head 60 and the distance between fluid ports 86 and 114. Particularly, as illustrated in FIG. 6, nuts 96 may be loosened on the studs 94 and the adjustable collar 100 may be moved along the first body portion 82 to lengthen the fracturing head 60. In this manner, the length (or what may instead be considered the height) of the fracturing head 60 may be varied to aid in aligning and coupling the fracturing manifold 22 and the fracturing tree 20 via the fluid connection 26, as discussed above. The fracturing head 60, as well as other adjustment joints in the system 10 (e.g., the fracturing heads 62 or 64, or the pipe connectors 130, 170, or 224 described below), may be constructed to allow for any desired amount of variation in dimension. For instance, the adjustment joints may be constructed to allow dimensional variation (e.g., lengthening) of seven inches in one embodiment, of twelve inches in another embodiment, and of eighteen inches in still another embodiment. Still further, it is noted that in addition to the translational and rotational degrees of freedom facilitated through use of the presently disclosed adjustment joints, angular adjustment between elements of the fracturing system 10 can be enabled through the inclusion of pivot joints or other suitable couplings.

The fracturing head 60 also includes various sealing elements to inhibit fluid leakage. For instance, as depicted, fracturing head 60 includes sealing elements 102, 106, 108, 110, and 112. The sealing elements are formed of any suitable material, such as an elastomer or metal. In one embodiment, the seals 110 include CANH™ seals available from Cameron International Corporation of Houston, Tex. Also, in one embodiment movement of the collar 100 pre-loads or energizes one or more of the seals of the fracturing head 60.

Figure 7:
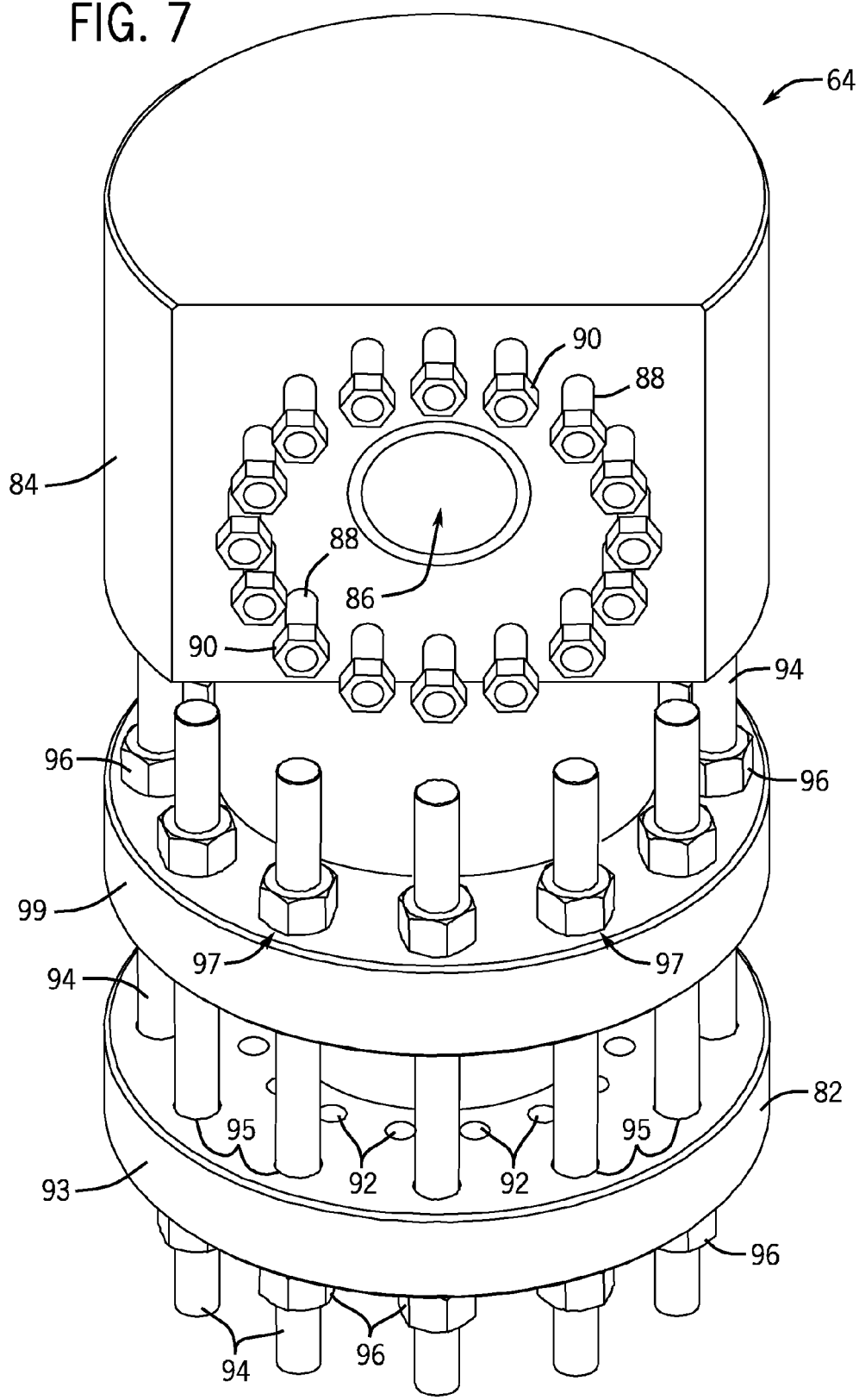
FIG. 7 is a perspective view of an adjustment joint in the form of a fracturing head having inlet and outlet ports that are not axially aligned with each other in accordance with an embodiment of the present disclosure.

As depicted in FIG. 7, the fracturing head 64 is generally similar to the fracturing head 60 (and the fracturing head 62, which is identical to the fracturing head 60 in one embodiment) but includes a fluid port 86 on a side face of the body portion 84 rather than on the top face. As illustrated in FIG. 3, such an arrangement enables the fracturing head 64 to connect a pipe of fluid connection 26 with the fracturing tree 20 via a bore bent at an angle (e.g., at a right angle) to change the direction of fluid flowing through the fracturing head 64. And a dimension of the fracturing head 64 may be varied in the same manner as described above with respect to fracturing head 60, thereby facilitating alignment and coupling of the fracturing tree 20 and the fracturing manifold 22 with the fluid connection 26.

Figure 8:
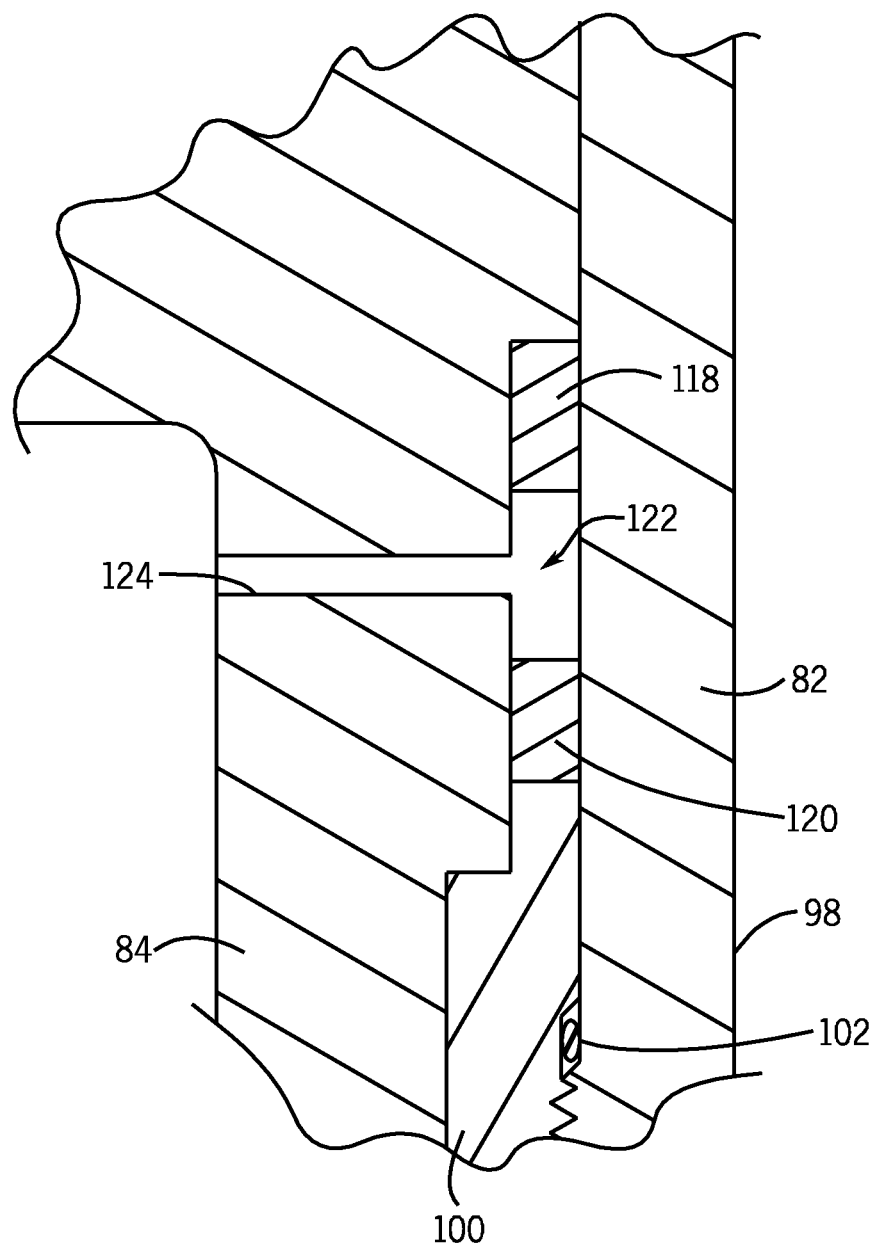
FIG. 8 is a partial cross-section of a fracturing head including a test port to enable integrity testing between two seals of the fracturing head in accordance with an embodiment of the present disclosure.

In one embodiment illustrated in FIG. 8, a fracturing head (e.g., fracturing head 60, 62, or 64) includes seals 118 and 120 (rather than sealing elements 106, 108, and 110) disposed in an annular space 122. The seals 118 and 120 are formed of any suitable material, and may include metal CANH™ seals in one embodiment. The annular space 122 is bound by the body portion 82, the body portion 84, and the adjustable collar 100. A test port 124 extends from the annular space 122 (e.g., at a location between the seals 118 and 120) to an exterior surface of the body portion 84 to allow connection of a pressure monitoring device to enable monitoring or testing of the integrity of the seals 118 and 120.

Figure 9:
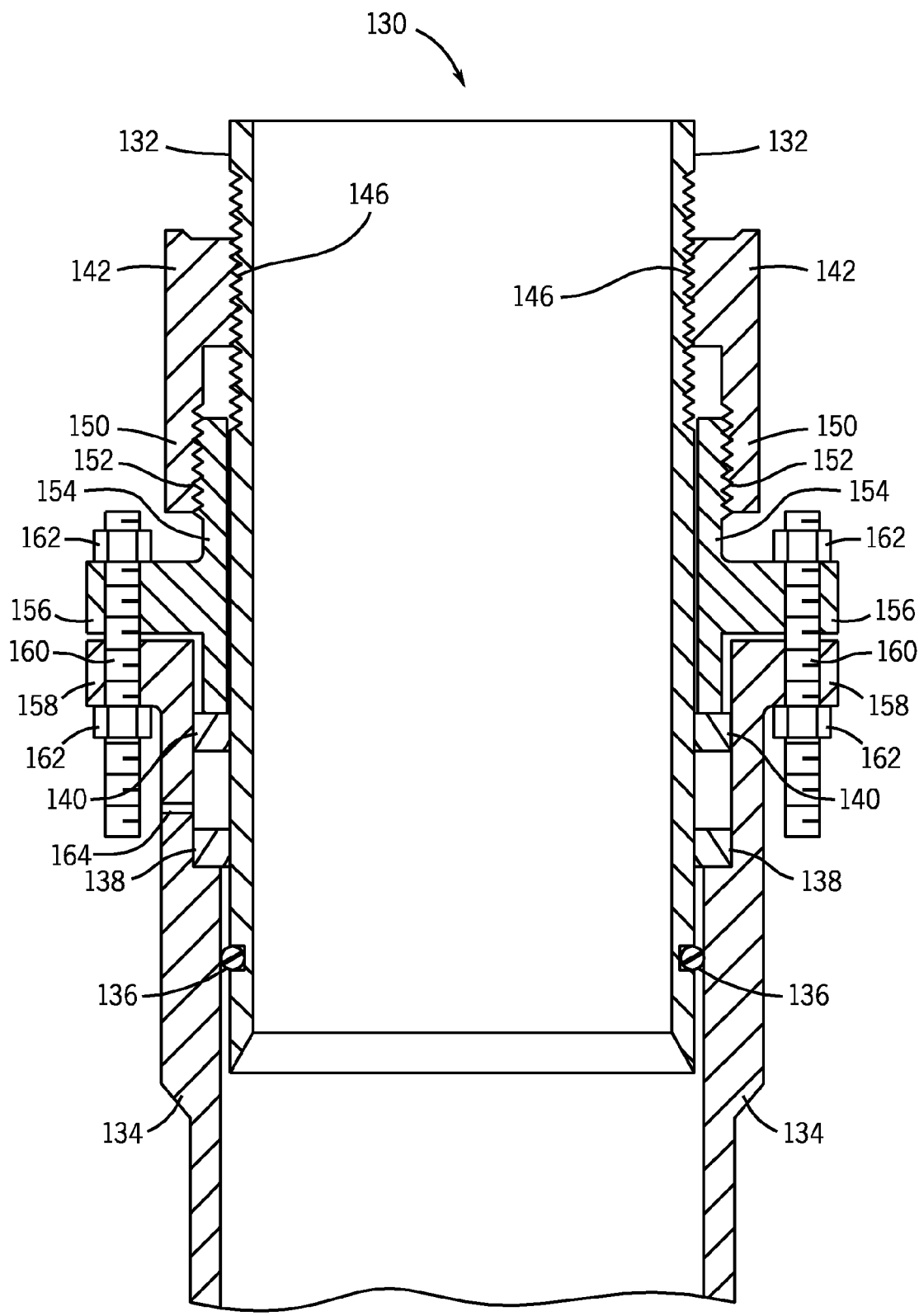
FIG. 9 is a cross-section of an adjustment joint in the form of a pipe connector having a length that may be varied in accordance with an embodiment of the present disclosure.

While the adjustment joints of the fracturing system 10 have been described above in the form as fracturing heads, other embodiments may use other adjustment joints in addition to, or in place of the fracturing heads. For example, one or more of the fracturing heads 60, 62, and 64 of FIG. 3 may be replaced by other adjustment joints in additional embodiments. One example of another adjustment joint is depicted in FIG. 9 in the form of a pipe connector 130. The connector 130 includes a first tubular member 132 and a second tubular member 134. The tubular members 132 and 134 may be pipes (e.g., of the fluid connection 26 or conduit 42), or they may be coupled to pipes or other conduits in any suitable fashion. The opposite ends of the connector include an inlet and an outlet, allowing fracturing fluid to flow through the connector 130 via the bores of either the members 132 and 134 themselves or of the pipes or other conduits joined by the connector 130.

The connector 130 is configured to enable relative movement between the tubular members 132 and 134 to allow variation in the length of the connector 130. Like the fracturing heads 60, 62, and 64, the connector 130 may be constructed to allow any desired range of variation in length, such as a range of seven inches or twelve inches. Various seals 136, 138, and 140 are provided between the tubular members 132 and 134. In one embodiment, the seal 136 is an elastomeric seal and the seals 138 and 140 are metal CANH™ seals.

The connector 130 also includes a collar 142 (which may also be referred to herein as union nut 142) that cooperates with a flanged collar 154 to adjust the length of the connector 130. The union nut 142 may be coupled to the first tubular member 132 in any suitable manner. In the depicted embodiment, threads 146 allow the union nut 142 to be threaded onto the tubular member 132. The union nut 142 includes an end 150 that engages the collar 154 via threads 152, and rotation of the union nut 142 causes the collar 154 to move along the axis of the connector 130 with respect to the tubular member 132. A flange 156 of the collar 154 is coupled to a mating flange 158 of the tubular member 134 by studs 160 and nuts 162. Consequently, rotation of the union nut 142 also causes the second tubular member 134 to be moved with respect to the first tubular member 132, thereby enabling the connector 130 to be lengthened or shortened through such operation. The connector 130 may also include a test port 164 to enable monitoring of the integrity of seals 138 and 140 in a manner similar to that described above with respect to test port 124 (FIG. 8).

In another embodiment generally depicted in FIGS. 10-14, an adjustment joint or connector 170 includes an inner tubular member or pipe 172 (which may also be referred to as a mandrel) that is received in an outer tubular member or pipe 174. Like the other adjustment joints described above, the ends of the inner and outer tubular members 172 and 174 can be connected to pipes or other components of a system (e.g., fracturing system 10). And similar to connector 130, the length of the adjustment joint 170 can be varied by extending or retracting the inner and outer tubular members 172 and 174 with respect to one another.

The adjustment joint 170 includes an inlet port 176 and an outlet port 178 that allow any desired fluid (e.g., fracturing fluid) to pass through the adjustment joint via bore 180. As here depicted, the inlet port 176 is provided by the inner tubular member 172 and the outlet port 178 is provided by the outer tubular member 174. But the orientation of the joint 170 could be reversed such that fluid entered the bore 180 via port 178 and exited via port 176.

The outer tubular member 174 includes a collar 182 at one end for receiving various components assembled between the inner and outer tubular members 172 and 174. In the presently depicted embodiment, such components include a seal assembly 184 for sealing between the inner and outer tubular members, a piston 186, and a seal carrier 188. Various retaining elements, here provided in the form of retaining rings 190 and 192 and a flanged collar 194, retain the piston 186 in the collar 182. Additionally, fluid ports 198 and 200 enable hydraulic actuation of the adjustment joint 170 (to vary its length) and hydraulic setting of the seal assembly 184. Plugs 202 seal the fluid ports 198 and 200 when not in use, and the plugs can be removed to allow fluid to be pumped into the adjustment joint 170 via the ports 198 and 200. Any suitable fluid could be used to actuate the adjustment joint 170 and set the seal assembly 184. For example, hydraulic control fluid could be used in some instances. And in others, such as in the field, grease pumps could be used. Indeed, with sufficient pressure the actuation and seal setting could be performed pneumatically.

Figure 11:
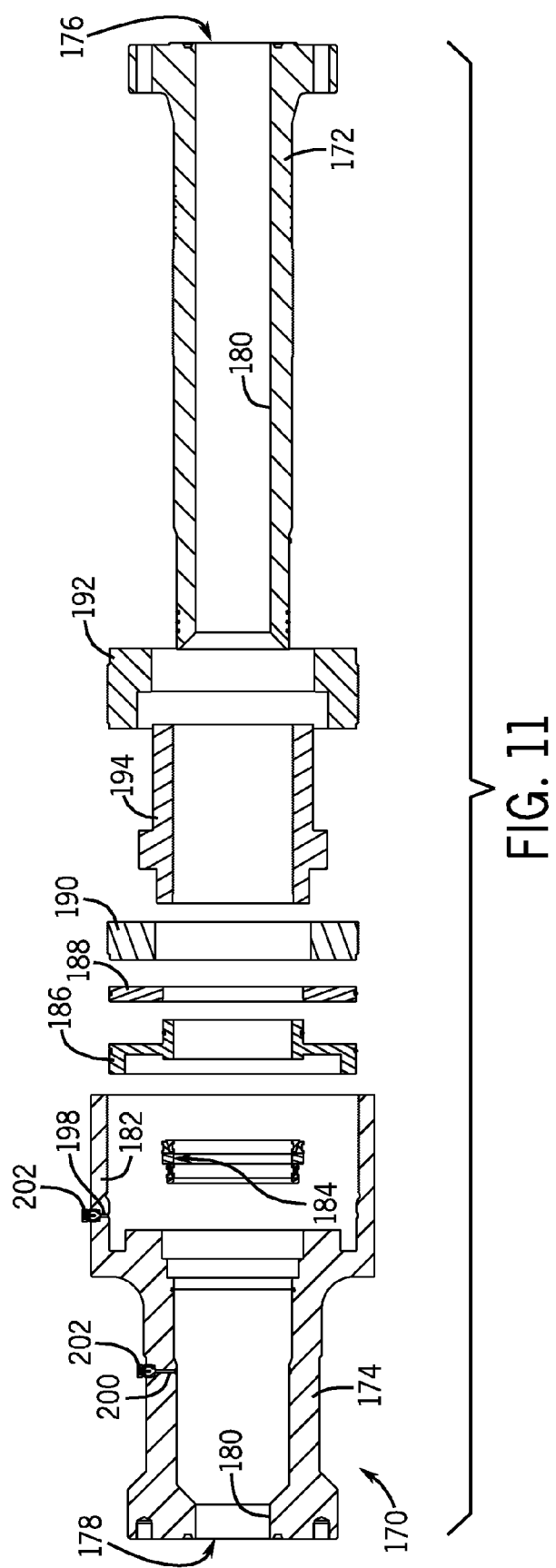
FIG. 11 is an exploded view of the sectioned adjustment joint of FIG. 10.

The components of the adjustment joint 170 are generally depicted in a disassembled state in FIG. 11. To assemble the adjustment joint 170, the seal assembly 184 is inserted into the outer tubular member 174 through the collar 182, followed by the piston 186 and seal carrier 188. Retaining ring 190 may then be threaded into the collar 182 to retain the piston 186 and the seal carrier 188. The retaining ring 192 is positioned about the inner tubular member 172 and the flanged collar 194 is threaded onto the inner tubular member 172, which can then be inserted into the collared end of the outer tubular member 174. Finally, the retaining ring 192 can be threaded into the collar 182 to draw the inner and outer tubular members 172 and 174 together.

Figure 10:
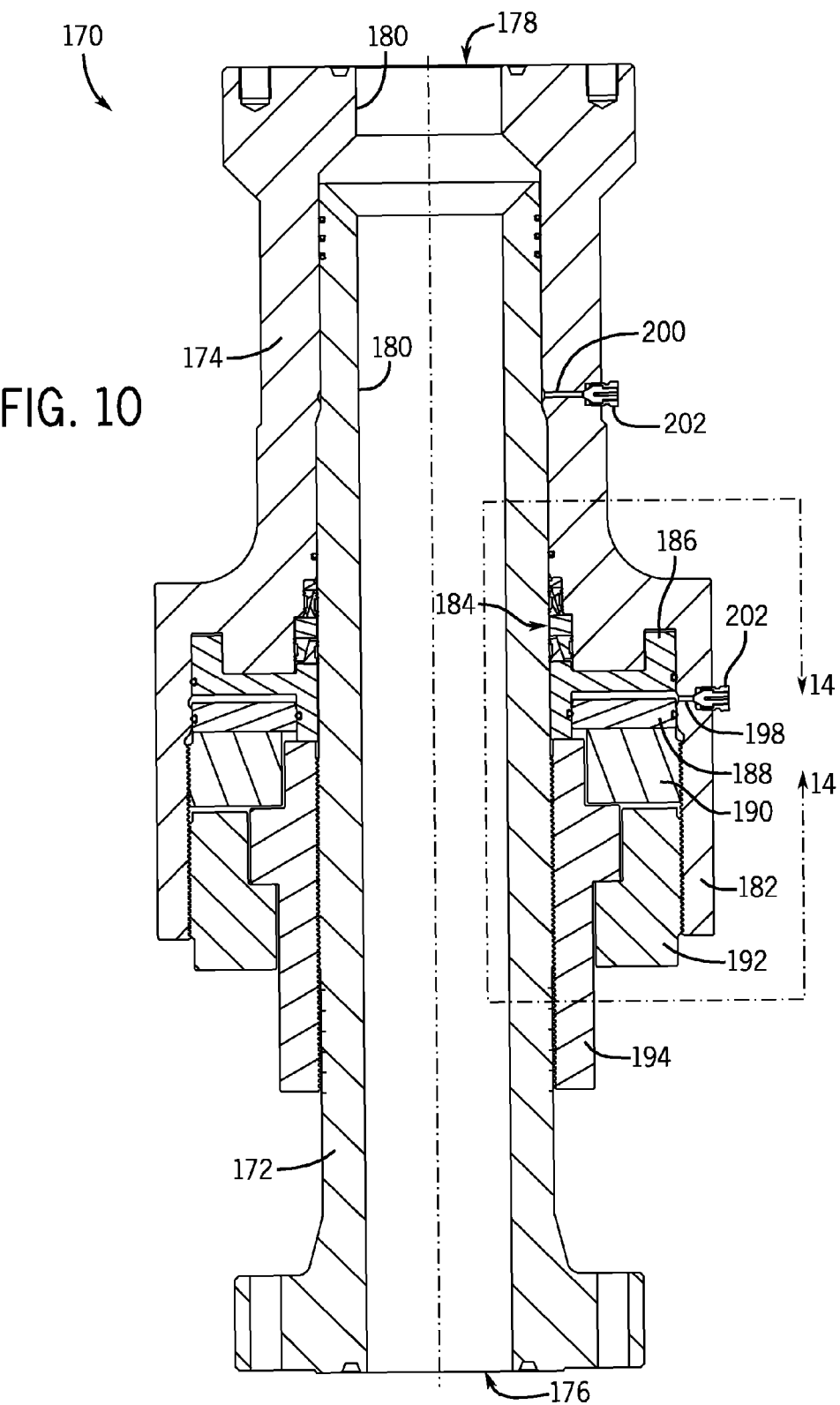
FIG. 10 is a cross-section of another adjustment joint with a variable length in accordance with one embodiment.

The assembled adjustment joint 170 is depicted in a retracted position in FIG. 10. The length of the adjustment joint 170 may be increased by unscrewing the retaining ring 192 from the collar 182 and extending the inner tubular member 172 from the outer tubular member 174, as generally depicted in FIG. 12. Moreover, in some embodiments the adjustment joint is hydraulically actuated. That is, hydraulic pressure is applied to the adjustment joint (e.g., via fluid port 200 in the presently depicted embodiment) to cause the inner and outer tubular members to move with respect to one another, resulting in variation of the length of the adjustment joint. Once the adjustment joint 170 has been changed to the desired length, the flanged collar 194 may be rotated about the inner tubular member 172 to draw into engagement with the piston 186 and the retaining ring 192 may be threaded into the collar 182 to retain the flanged collar 194 and the inner tubular member 172 in their set positions, as generally depicted in FIG. 13.

Figure 14:
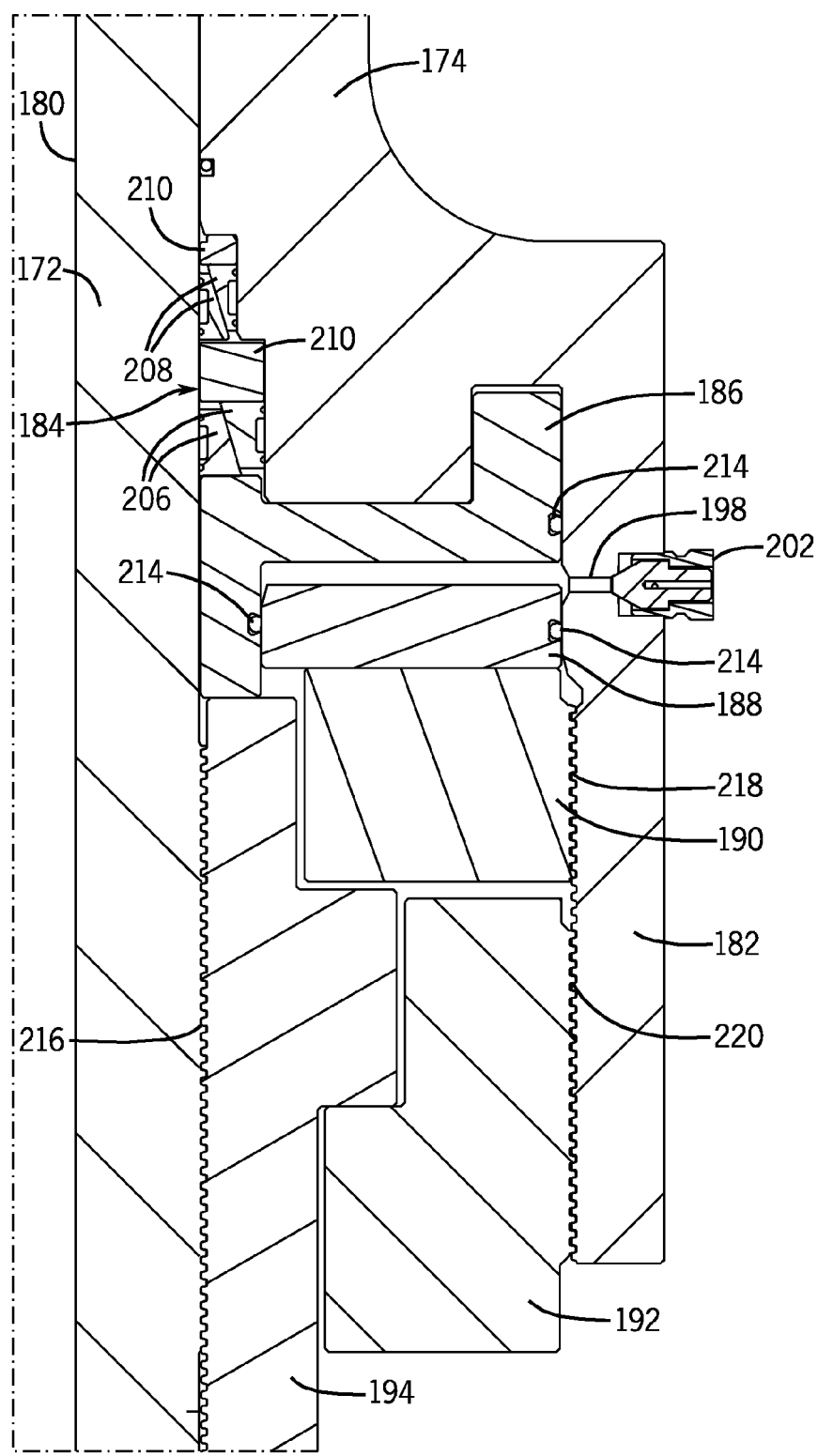
FIG. 14 is a detail view of a seal assembly and piston of the adjustment joint of FIG. 10.

In at least some embodiments, hydraulic pressure is also used to set the seals of seal assembly 184 between the inner and outer tubular members 172 and 174. As illustrated in FIG. 14, the seal assembly 184 includes seals 206 and 208 with spacers 210. More specifically, the seals 206 and 208 are depicted as a pair of metal CANH™ seals with each seal including inner and outer sealing rings. But other types of seals could also be used, and the seal assembly could include any desired number of seals.

The plug 202 can be removed from the fluid port 198 to pump hydraulic fluid into the annular space bound by the piston 186, the seal carrier 188, and the inside of the collar 182. Seals 214 are provided in the piston 186 and the seal carrier 188 to inhibit leakage of hydraulic fluid from the annular space. Further, the pressurized fluid in the annular space drives the piston 186 into the seal 206. The angled interface of the sealing rings of seal 206 causes the sealing rings to press against the inner and outer tubular members 172 and 174 in response to the load applied by the piston 186. Similarly, the hydraulic setting force on the piston 186 is also transmitted from the seal 206 to the seal 208 via an intervening spacer 210, thus also causing the sealing rings of seal 208 to press against the inner and outer tubular members 172 and 174. The flanged collar 194 and the retaining rings 190 and 192 generally retain the various components within the collar 182, and each of these devices is connected to one of inner or outer tubular members 172 and 174 via a respective threaded interface 216, 218, or 220. Further, the seals of seal assembly 184 may be hydraulically set at various desired times during installation or adjustment of the joint 170. For instance, the seals could be set with the retaining ring 192 and the flanged collar 194 removed from the collar 182 (as in FIG. 12), or they could be set with one or both of the retaining ring 192 and the flanged collar 194 threaded into place within the collar 182.

Figure 15:
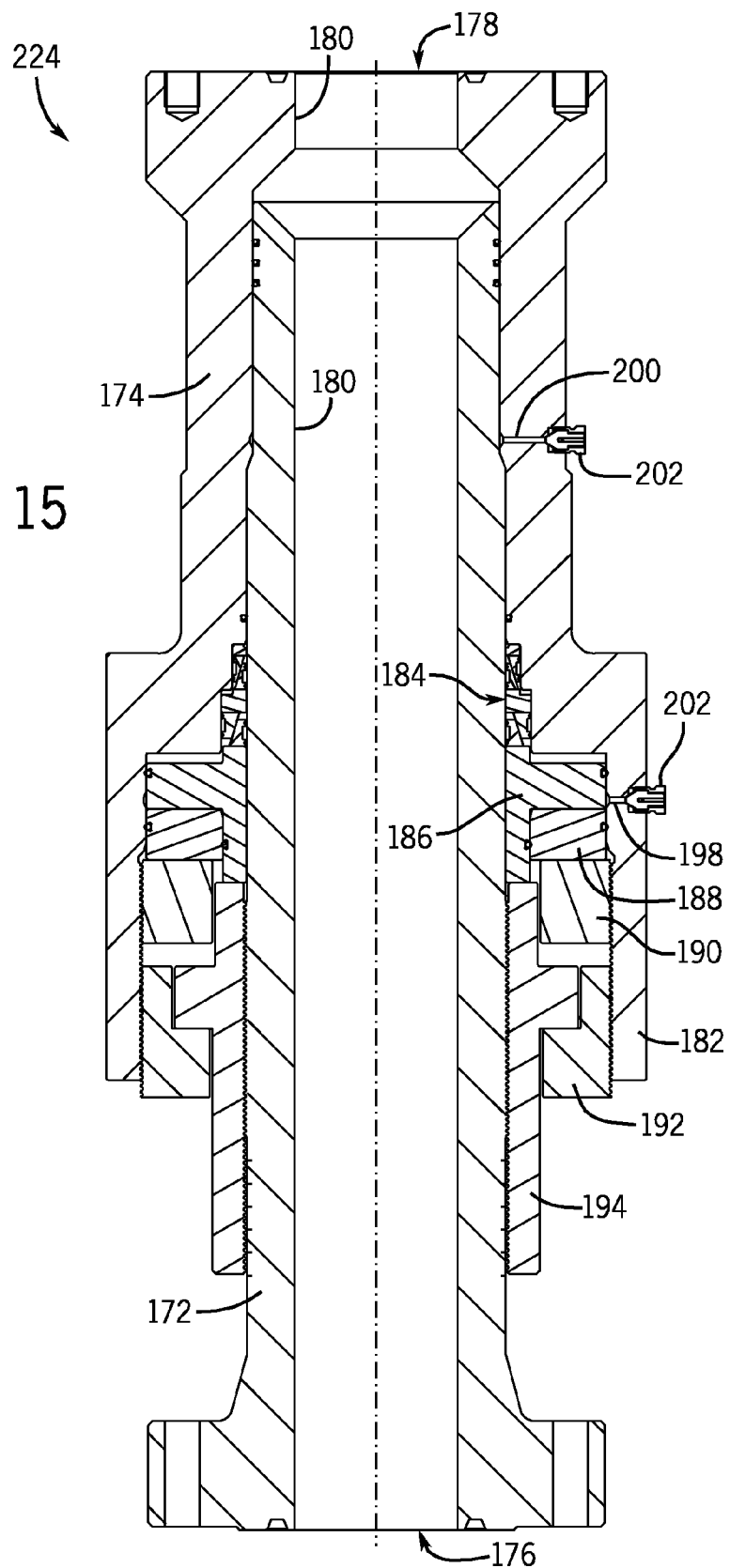
FIG. 15 is a cross-section of still another adjustment joint in accordance with one embodiment.

Another adjustment joint 224 is depicted in FIG. 15 in accordance with an additional embodiment. Adjustment joint 224 is similar to adjustment joint 170 described above, and is depicted as also having a seal assembly 184, a piston 186, a seal carrier 188, retaining rings 190 and 192, and a flanged collar 194. But some of these components in the adjustment joint 224 geometrically differ from their counterparts in the adjustment joint 170 to allow the adjustment joint 224 to have a lower profile (i.e., it is more slender). Fluid ports 198 and 200 in adjustment joint 224 also allow the hydraulic actuation of the joint 224 and hydraulic setting of the seal assembly 184. Moreover, it will be appreciated that any of the adjustment joints described above could have additional fluid ports, such as test ports or bleed ports.

While the aspects of the present disclosure may be susceptible to various modifications and alternative forms, specific embodiments have been shown by way of example in the drawings and have been described in detail herein. But it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system comprising:
    an adjustment joint including an inlet, an outlet, and a bore to transmit a fracturing fluid through the adjustment joint, wherein the adjustment joint is configured to be varied in length to facilitate coupling of a fracturing manifold to a fracturing tree; the adjustment joint includes a pipe connector having a first collar disposed about a first tubular member and a second collar having a flange; the first collar includes an interior, threaded surface to engage a mating surface of the second collar; the flange of the second collar is coupled to a mating flange of a second tubular member; the pipe connector is configured such that rotation of the first collar causes translation of the second collar with respect to the first collar to vary the length of the pipe connector; and wherein the adjustment joint comprises a first seal and a second seal in an annular space bound by the first tubular member, the second tubular member, and the second collar, and includes a test port extending from the annular space at a position between the first seal and the second seal and through the second tubular member.

2. The system of claim 1, comprising:
    the fracturing manifold; and
    the fracturing tree coupled to the fracturing manifold to enable receipt of the fracturing fluid from the fracturing manifold.

3. The system of claim 2, wherein the fracturing manifold is mounted on at least one skid to enable movement of the fracturing manifold and includes a plurality of valves to control flow of fracturing fluid from the fracturing manifold to a plurality of fracturing trees.

4. The system of claim 3, wherein the plurality of valves includes a first valve to control flow of the fracturing fluid from the fracturing manifold to a first fracturing tree and a second valve to control flow of the fracturing fluid from the fracturing manifold to a second fracturing tree, and the adjustment joint is disposed in the fracturing manifold to enable variation in the distance between the first valve and the second valve.

5. The system of claim 2, wherein the fracturing manifold includes a valve to control flow of fracturing fluid from the fracturing manifold to the fracturing tree, and the adjustment joint is disposed between the valve and the fracturing tree to enable variation in the length of a fluid connection between the valve and the fracturing tree.

6. The system of claim 5, comprising an additional adjustment joint disposed between the valve and the fracturing tree to enable variation in the length of the fluid connection between the valve and the fracturing tree, wherein the adjustment joint and the additional adjustment joint enable variation in the length of the fluid connection in different directions from one another.

7. The system of claim 2, comprising two additional adjustment joints, wherein the adjustment joint and the two additional adjustment joints enable three translational degrees of freedom in aligning a pipe connection between the fracturing manifold and the fracturing tree.

8. The system of claim 2, wherein the fracturing tree is coupled to the fracturing manifold by a single fluid connection.

9. The system of claim 1, wherein the adjustment joint includes a fluid port that enables the length of the adjustment joint to be varied through hydraulic actuation.

10. The system of claim 1, wherein the adjustment joint includes a seal and a piston that is positioned to set the seal in response to hydraulic pressure on the piston.

\* \* \* \* \*